E. F. & J. H. STACY.
Assignors to W. PROUDMAN, Jr.
OVERALLS.
No. 7,404. Reissued Nov. 28, 1876.
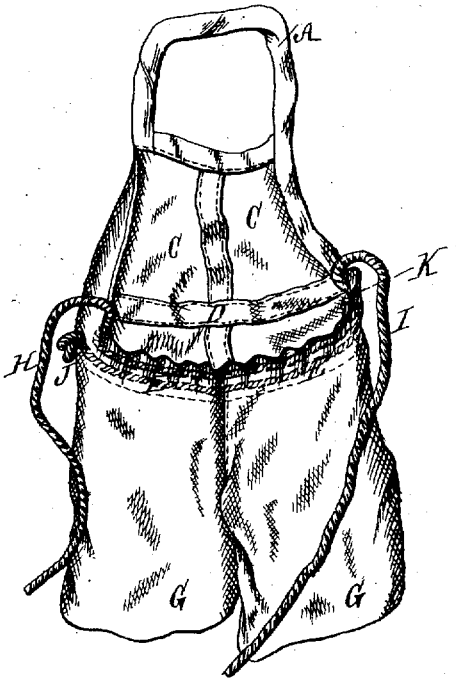
Witnesses.
L. Van Rijswick.
D. G. Stuart
Inventors.
Eli F. Stacy & John H. Stacy
per D. Hannay
atty.
THE GRAPHIC CO. N.Y.

UNITED STATES PATENT OFFICE.

ELI F. STACY AND JOHN H. STACY, OF GLOUCESTER, MASSACHUSETTS, ASSIGNORS TO WM. PROUDMAN, JR., OF ALBANY, NEW YORK; AND SAID W. PROUDMAN, JR., ASSIGNOR TO GEORGE R. EAGER, OF BOSTON, MASSACHUSETTS.

IMPROVEMENT IN OVERALLS.

Specification forming part of Letters Patent No. 125,994, dated April 23, 1872; reissue No. 7,404, dated November 28, 1876; application filed July 18, 1876.

*To all whom it may concern:*

Be it known that we, ELI F. STACY and JOHN H. STACY, of Gloucester, in the county of Essex and State of Massachusetts, have invented certain new and useful Improvements in Overalls; and we do hereby declare that the following is a full, clear, and exact description thereof, that will enable others skilled in the art to which it appertains to make and use the same, reference being had to the accompanying drawings, and to the letters of reference marked thereon, which form a part of this specification, in which the figure represents a view, in perspective, as taken from the rear of a pair of overalls having our improvements applied thereto.

Our improved outer garments, commonly called "overalls," are intended mainly for the use of fishermen, the object being to secure a smooth front, free from buckles, buttons, or straps where the cloth comes in contact with the rail of a vessel, the waist of the garment being drawn taut and secured around the waist of the wearer by two separate lines drawing in opposition to each other, thus gathering the cloth in folds at the back of the garment, and retaining a smooth and even surface at the front.

Our improvement relates to an improved mode of constructing the garment, whereby the waist is easily adjusted to suit the size of the wearer.

In the drawing making a part of this specification, the neck-band commonly used is shown at A attached to the breast-piece C, at the bottom of which, at the waist, there is a strong broad band, D. The length of this band is about one-half of the circumference of the waist. Beginning at the ends of this band, at the right and left sides, but at a point somewhat below the latter, there is formed on the upper end, which forms the top of the rear portion of the garment, an open hem, E, in the nature of a waistband for that portion, and which receives the strings H and I, which are drawn through the hem, as shown by the dotted lines, each string being made fast to the ends of the band or belt D by the knots J and K.

The wearer draws on the legs G G first; then secures the loop A over the neck; then draws the strings which gather the back of the garment. The strings are then brought to the front and tied.

What we claim as a new article of manufacture is—

1. A pair of overalls provided with a hollow at its rear on the top, for the reception of a cord or cords, for the purposes set forth.

2. A pair of overalls provided with a hollow waist, in which is arranged a device whereby to adjust the garment, as set forth.

3. A garment consisting of the legs, breast-piece, hollow waist, and adjusting device, substantially as herein shown and described.

In testimony that we claim the foregoing we have hereunto set our hands this 8th day of July, 1876.

ELI F. STACY.
JOHN H. STACY.

Witnesses:
FRED. L. STACY,
JOHN CUNNINGHAM.